United States Patent
Tung et al.

[11] Patent Number: 5,967,812
[45] Date of Patent: Oct. 19, 1999

[54] CARD EJECTOR FOR CARD CONNECTOR APPARATUS

[75] Inventors: Shun-Chi Tung, Tu-Chen; Hung-Ji Yu, Taipei Hsien, both of Taiwan

[73] Assignee: Hon Hai Precision Ind. Co., Ltd., Taipei Hsien, Taiwan

[21] Appl. No.: 09/062,871

[22] Filed: Apr. 20, 1998

[30] Foreign Application Priority Data

Apr. 18, 1997 [TW] Taiwan ................................. 86206263
Apr. 29, 1997 [TW] Taiwan ................................. 86207077

[51] Int. Cl.⁶ ................................................. H01R 13/62
[52] U.S. Cl. ................................................. 439/159
[58] Field of Search ................................. 439/159

[56] References Cited

U.S. PATENT DOCUMENTS 5,507,658  4/1996  Ho ........................................... 439/159

Primary Examiner—Steven L. Stephan
Assistant Examiner—Javaid Nasri

[57] ABSTRACT

A card connector apparatus includes a header connector having a housing mounted with a number of contacts for engaging with a card inserted into the apparatus, and an ejector for ejecting an inserted card. The ejector consists of a shielding shell fixed to the housing and defining a central guiding pin, a hole and a stop wall between the pin and the hole. A lever has a force exerting end, a force receiving tongue connecting with a push bar, a protrusion extending into the hole and a ridge between the protrusion and the force exerting end. An actuator has a central tab extending through the force exerting end to slidably engage with the pin and two side tabs for engaging with two lateral sides of an inserted card. When the ejector is actuated to eject a card fully inserted into the apparatus by pushing the push bar to pivot the lever, the lever first pivots about a contact point between the stop wall and the ridge so that the card can be ejected with a reduced required force. As soon as the card disengages from its connection with the contacts, the lever pivots about a contact point between the protrusion and the shielding shell so that the card can be ejected with a reduced operating time.

12 Claims, 8 Drawing Sheets

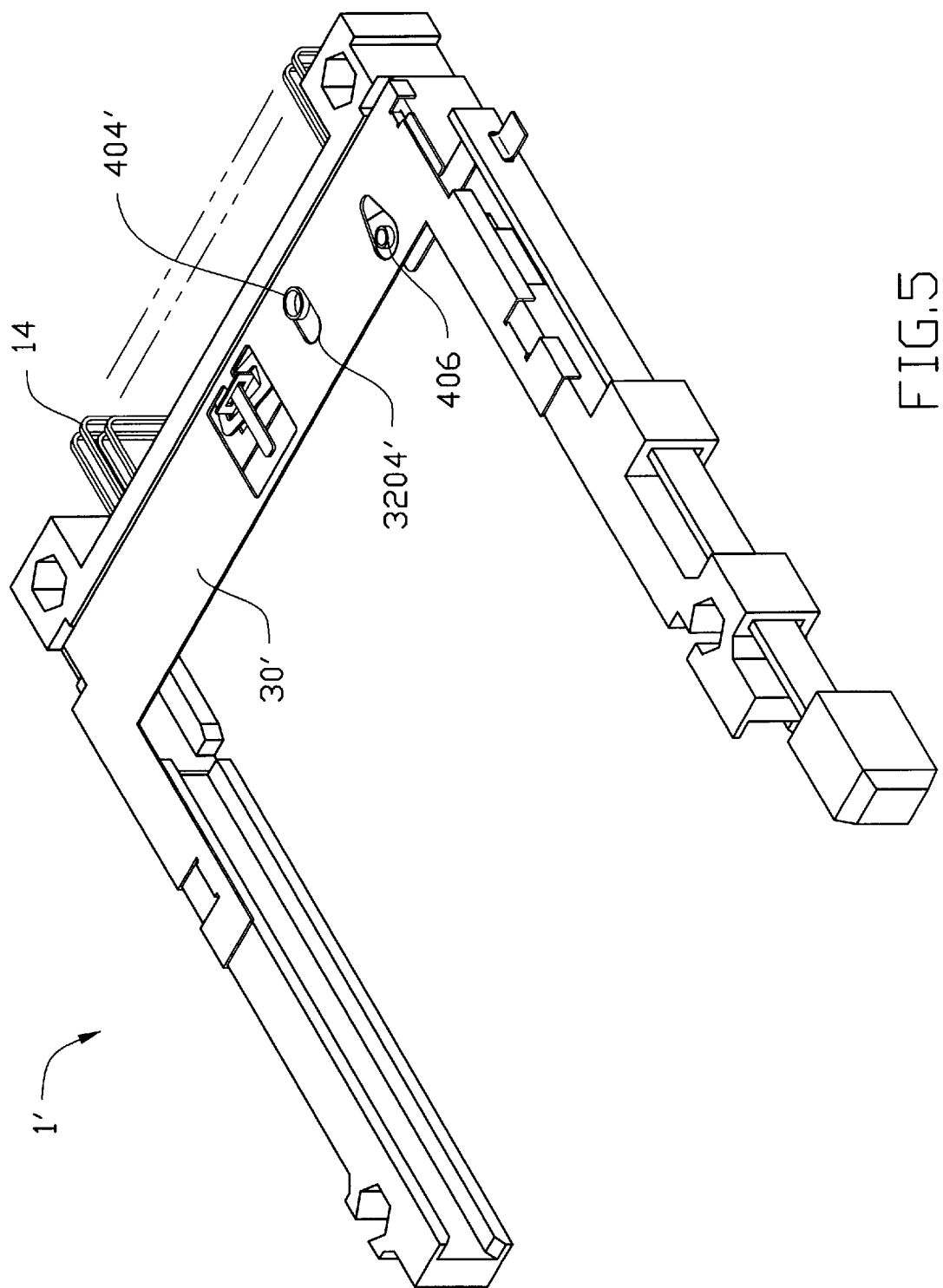

5,967,812

CARD EJECTOR FOR CARD CONNECTOR APPARATUS

BACKGROUND OF THE INVENTION

1. Field of The Invention

The present invention relates to a card ejector for a card connector apparatus, and particularly to a card ejector for a card connector apparatus which ejects an inserted card by a first reduced force step and a second time efficient step.

2. The Prior Art

A card connector apparatus provided in a portable (laptop) computer is generally equipped with a card ejector for ejecting an inserted IC card (also called memory card). There are a variety of designs concerning card ejectors, such as those disclosed in U.S. Pat. Nos. 5,051,101, 5,139,435 and Taiwan Patent Application Nos. 82101136 and 82102557. These designs share a common disadvantage, namely a large force must be exerted on a push button of the ejector to eject the inserted IC card from its connection with contacts of the connector apparatus.

To overcome the disadvantage, U.S. Pat. Nos. 5,383,789 and 5,421,737 disclose card ejectors which can reduce the required force to eject the card from its connection with the contacts. However, due to structural limitations of each ejector, an ejection force is exerted at only a single point of an inserted card thereby causing the card to be inclined relative to guiding frames of the ejector during ejection. Therefore, the card cannot be smoothly ejected, or may even be obstructed by the guiding frames and cannot be successfully ejected from the connector apparatus.

Hence, an improved card ejector for a card connector apparatus is needed to eliminate the above mentioned defects of current card ejectors.

SUMMARY OF THE INVENTION

Accordingly, an objective of the present invention is to provide a card ejector for a card connector apparatus which ejects an inserted card in two steps, wherein during the first step the ejector ejects the inserted card with a reduced force required to be exerted on a push button, and during the second step the ejector ejects the inserted card with a reduced operating time.

Another objective of the present invention is to provide a card ejector for a card connector apparatus which ejects an inserted card by pushing two lateral sides thereof so that the card can be smoothly ejected along a guiding frame of the apparatus without being obstructed thereby.

To fulfill the above mentioned objectives, according to one embodiment of the present invention, a card ejector for a card connector apparatus includes a shielding shell fixed to a housing of a header connector of the apparatus. The shielding shell defines a hole, a guiding pin and a stop wall between the hole and the guiding pin. A force transmitting lever has a force exerting end, a force receiving tongue, a protrusion located between the tongue and the force exerting end and extending into the hole, and a ridge located between the protrusion and the force exerting end. An actuator has a central tab extending through the force exerting end to slidably engage with the guiding pin, and two side tabs for engaging with two lateral sides of an inserted IC card. A pushing bar has a first end connecting with the force receiving tongue and a second end connecting with a push button.

When the IC card is inserted into the apparatus to an inner-most position to engage with contacts of the header connector, the lever is moved to a position where the ridge thereof contacts with the stop wall. When the card is ejected from the inner-most position by pushing the push button, the lever first pivots about a contact point between the ridge and the stop wall until the IC card disengages from its connection with the contacts, whereby the protrusion in the hole moves to contact with the shielding shell. Then, the lever will further pivot about a contact point between the protrusion and the shielding shell to eject the IC card to a final ejected position.

The contact point between the ridge and the stop wall is spaced from the force receiving tongue a distance which is much longer than the distance between the contact point and the force exerting end; thus, the force required to be exerted on the push button in order to pivot the lever to eject the IC card from its engagement with the contacts of the header connector can be significantly reduced. Furthermore, the contact point between the protrusion and the shielding shell is spaced from the force exerting end a distance which is much longer than the distance between the contact point and the force receiving tongue; thus, the required operating time for ejecting the IC card from the position where the IC card disengages from its connection with the contacts to the final ejected position can be significantly reduced.

BRIEF DESCRIPTION OF THE DRAWINGS

FIG. 5 is a perspective view of the assembled card connector apparatus of FIG. 4;

DETAILED DESCRIPTION OF THE PREFERRED EMBODIMENT

Reference will now be made in detail to the preferred embodiments of the present invention.

Figure 1:
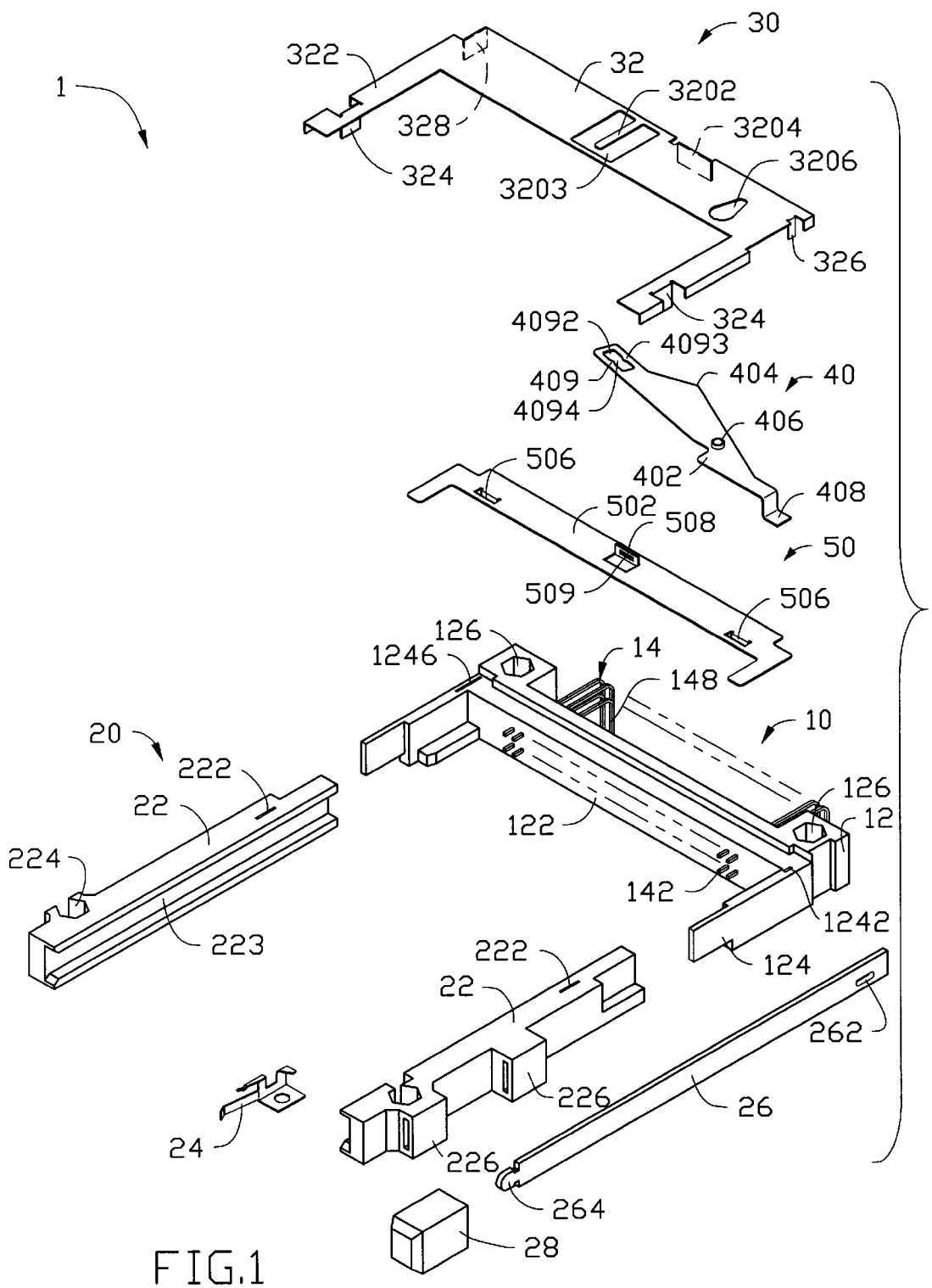
FIG. 1 is a perspective, exploded view showing a card connector apparatus in accordance with a first embodiment of the present invention.

Referring to FIG. 1, a card connector apparatus 1 in accordance with a first embodiment of the present invention includes a header connector 10 with a dielectric housing 12 and a number of contacts 14 mounted to an elongate main body 122 of the housing 12, a guiding frame 20, a push bar 26, a push button 28, an electromagnetic shielding shell 30, a force transmitting lever 40 and an actuator 50.

The housing 12 is further formed with a pair of mounting arms 124 defining first short and long engaging slits 1242, 1246 therein. Two hexagonal holes 126 are defined in the housing 12 at a rear of the mounting arms 124, respectively, for fittingly receiving two screws (not shown) to fasten the housing 12 to a printed circuit board (PCB, not shown) on which the connector 12 is mounted.

The contacts 14 have terminal portions 148 extending beyond a rear and bottom face (not labeled) of the housing 12 for being soldered to the PCB, and contact portions 142 at a front of the elongate body 122 of the housing 12 for electrically engaging with socket terminals (not shown) on an IC card 60 (FIG. 3A) inserted into the apparatus 1.

The guiding frame 20 consists of a pair of guiding posts 22 each defining a second engaging slit 222 in a top face (not labeled) thereof, a hexagonal hole 224 in front of the corresponding engaging slit 222 for fittingly receiving a screw (not shown) to fix the corresponding post 22 to the PCB, and a guiding groove 223 in an inner face thereof for slidably receiving a lateral edge of the inserted IC card 60. In FIG. 1, the right side guiding post 22 further forms a pair of mounting ears 226 for mounting the push lever 26 thereto.

A grounding spring plate 24 is mounted to the right side guiding post 22 within the guiding channel 223 thereof, whereby when the IC card 60 is inserted into the apparatus 1, electrostatic charges carried by the IC card 60 can be firstly transmitted to ground before the IC card 60 is electrically engaged with the contacts 14.

The push bar 26 is formed as an elongate metallic plate having a front end 264 with a semi-circular configuration for fixedly connecting with the push button 28, and a rear end (not labeled) defining a slot 262 for fittingly engaging with a force receiving tongue 408 of the force transmitting lever 40.

The actuator 50 is formed by stamping a metal sheet to have an elongate, rectangular body portion 502 with a central, upward projecting tab 508 defining a hole 509 therein and two downward projecting actuating tabs 506 beside the central tab 508.

The force transmitting lever 40 is also formed by stamping a metal sheet to have a body portion 402 with the force receiving tongue 408 extending downward from a right side thereof and a force exerting end 409 at a left side thereof. The force exerting end 409 defines a rectangular hole 4092 therein, and two arced projections 4093 extending into the rectangular hole 4092 thereby forming a neck 4094. The body portion 402 further forms a circular protrusion 406 and a ridge 404 between the protrusion 406 and the force exerting end 409.

The shielding shell 30 is also formed by stamping a metal sheet to have a generally U-shaped configuration with a rectangular body portion 32 and a pair of engaging arms 322 extending forward from two lateral sides of the body portion 32. Each engaging arm 322 has a first engaging tab 324 projecting downward from a front end thereof. The body portion 32 forms a second small engaging tab 326 at a rear, right side thereof, a second large engaging tab 328 at a rear, left side thereof and a pear-shaped hole 3206 near the small engaging tab 326. The pear-shaped hole has a large part (not labeled) near the right engaging arm 322. The body portion 32 further forms a guiding pin 3202 projecting from a center of a rear side thereof into a central rectangular opening 3203 so that the pin has good resilience, and a stop wall 3204 extending downward from the rear side of the body portion 32 between the guiding pin 3202 and the hole 3206.

Figure 2:
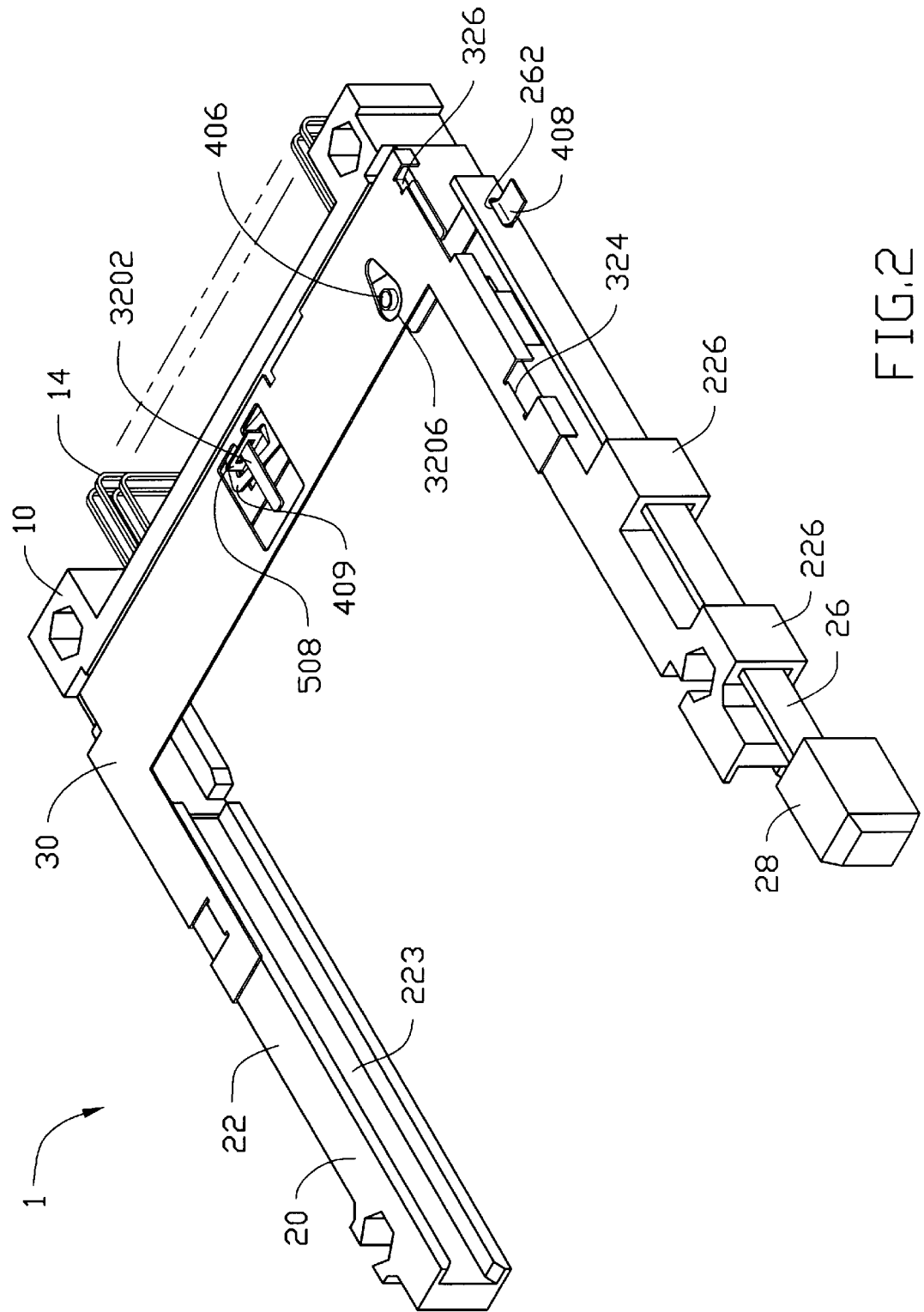
FIG. 2 is a perspective view of the assembled card connector apparatus of FIG. 1.

To assemble the apparatus 1, the actuator 50 is first assembled to the force transmitting lever 40 by extending the central tab 508 into the hole 4092 between the projections 4093. Then, the shielding shell 30 is assembled to the actuator 50 and the force transmitting lever 40 by extending the guiding pin 3203 into the rectangular hole 509 of the central tab 508 (best seen in FIG. 2) whereby the lever 40 is sandwiched between the shielding shell 30 and the actuator 50, and the central tab 508 of the actuator 50 is slidably engaged with the guiding pin 3202. Thereafter, the shielding shell 30 is assembled to the header connector 10 and the guiding frame 20 by inserting the second large and small engaging tabs 328, 326 into the first large and small mounting slits 1246, 1242 of the housing, respectively, and the first engaging tabs 324 into the second mounting slits 222 of the guiding posts 22 of the guiding frame 20, respectively. Finally, the front end 264 of the pushing bar 26 is fixedly fitted into the pushing button 28 to connect therewith, and the rear end of the push bar 26 is extended through the mounting ears 226 to reach a position in which the force receiving tongue 408 of the force transmitting lever 40 fittingly extends through the hole 262 to fixedly connect with the push bar 26, as shown in FIG. 2.

Figure 3A:
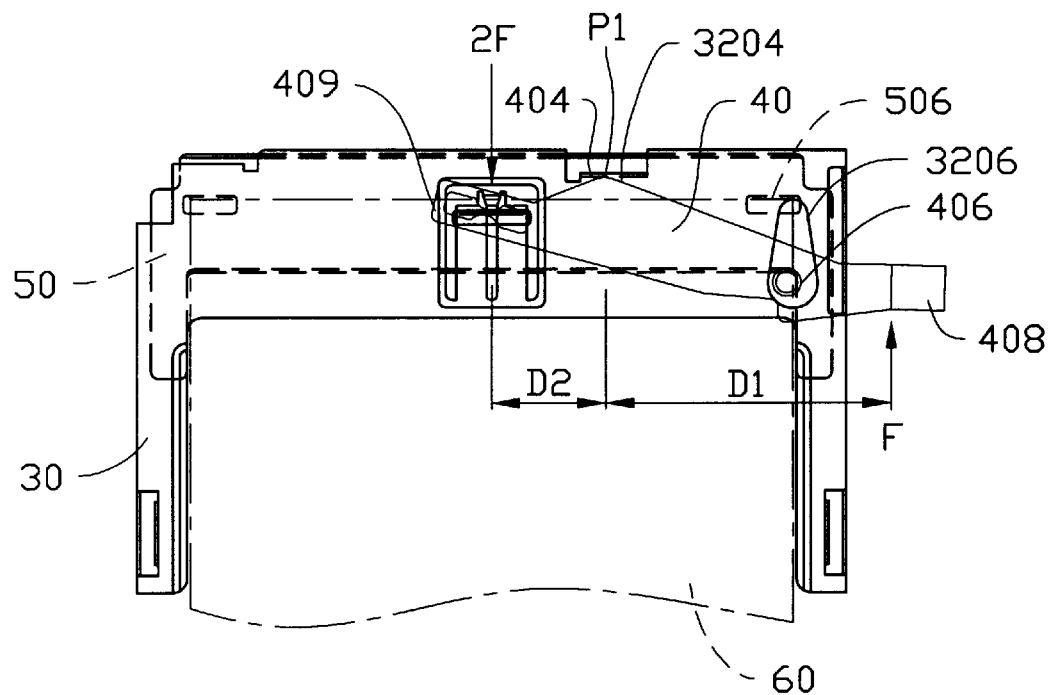
FIG. 3A is a diagrammatic view of a portion of a card ejector of the card connector apparatus of FIG. 1, wherein the card ejector is at a first position for ejecting an IC card fully inserted into the apparatus and engaging with contacts thereof.

As shown in FIG. 3A, when the IC card 60 is fully inserted into the apparatus 1 to reach an inner-most position and engage with the contact portions 142 of the contacts 14, the force transmitting lever 40 is moved to a position in which the ridge 404 contacts with the stop wall 3204 and the protrusion 406 is located in the large part of the pear-shaped hole 3206. At this position, the contact point between the ridge 404 and the stop wall 3204 constitutes a first fulcrum P1 for the lever 40 to pivot clockwise to eject the IC card 60; the first fulcrum P1 is spaced from the force receiving tongue 408 a first distance D1 and from the force exerting end 409 a second distance D2. D1 is much longer than D2 (in this embodiment, D1 is generally twice D2). Thus, when the force receiving tongue 408 receives a pushing force F from the pushing button 28 via the push bar 26 to move upwardly, a downward ejecting force of 2F will be generated at the force exerting end 409 to eject the IC card 60 via the two actuating tabs 506 of the actuator 50, whereby the force required to be exerted on the push button 28 to disengage the IC card 60 from its engagement with the contacts 14 is significantly reduced. Furthermore, since in the present invention the IC card 60 is ejected by the two actuating tabs 506 engaging with two lateral sides (not labeled) thereof, the IC card 60 can be linearly and smoothly ejected along the guiding frame 20, without being blocked by the guiding frame 20 due to an inclination of the IC card 60 during ejection.

Figure 3B:
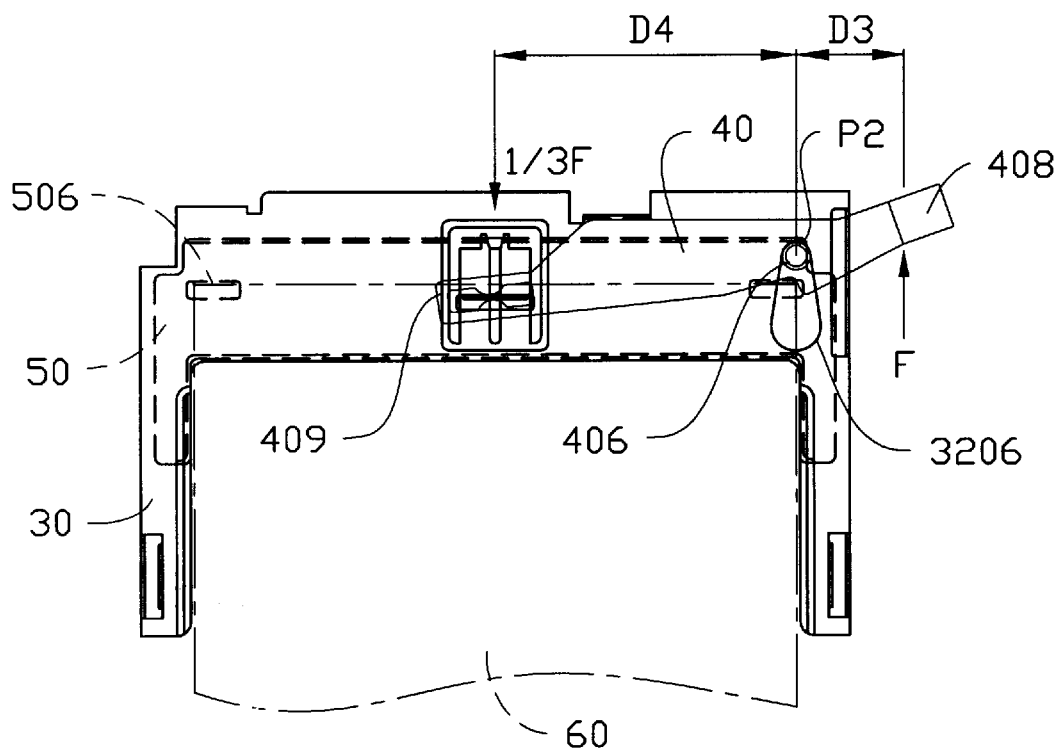
FIG. 3B is a view similar to FIG. 3A, showing that the card ejector is actuated to move from the first position to a second position wherein the IC card is ejected from its engagement with the contacts.
Figure 3C:
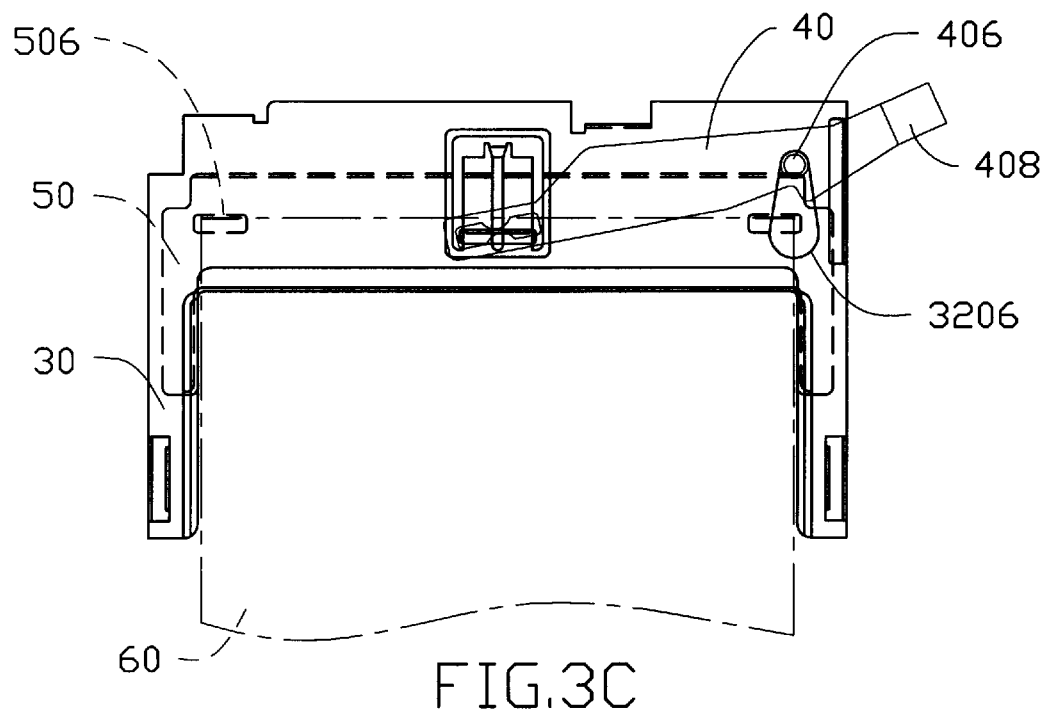
FIG. 3C is a view similar to FIG. 3A, showing that the card ejector is actuated to move from the second position to a third position wherein the IC card is moved to a final ejected position.
Figure 3D:
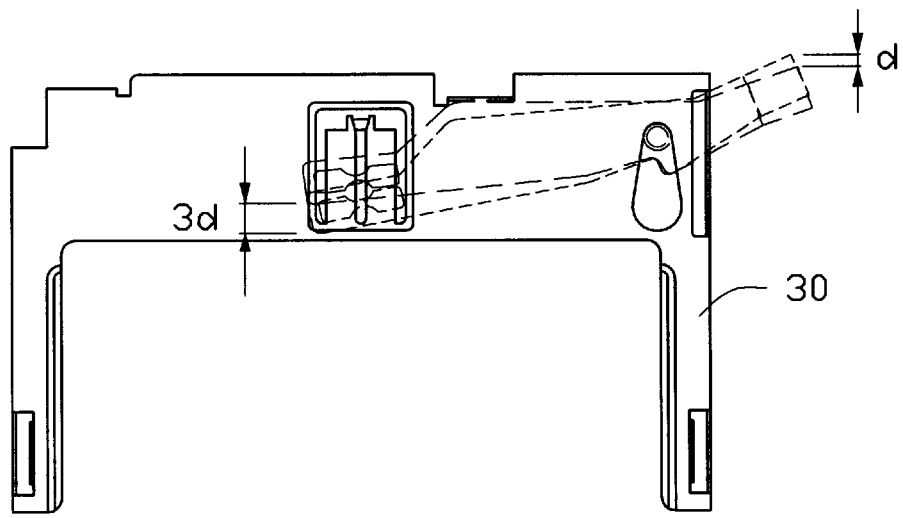
FIG. 3D is a view similar to FIG. 3A with different lines showing the movement of a force transmitting lever of the card ejector from the second position to the third position.
Figure 4:
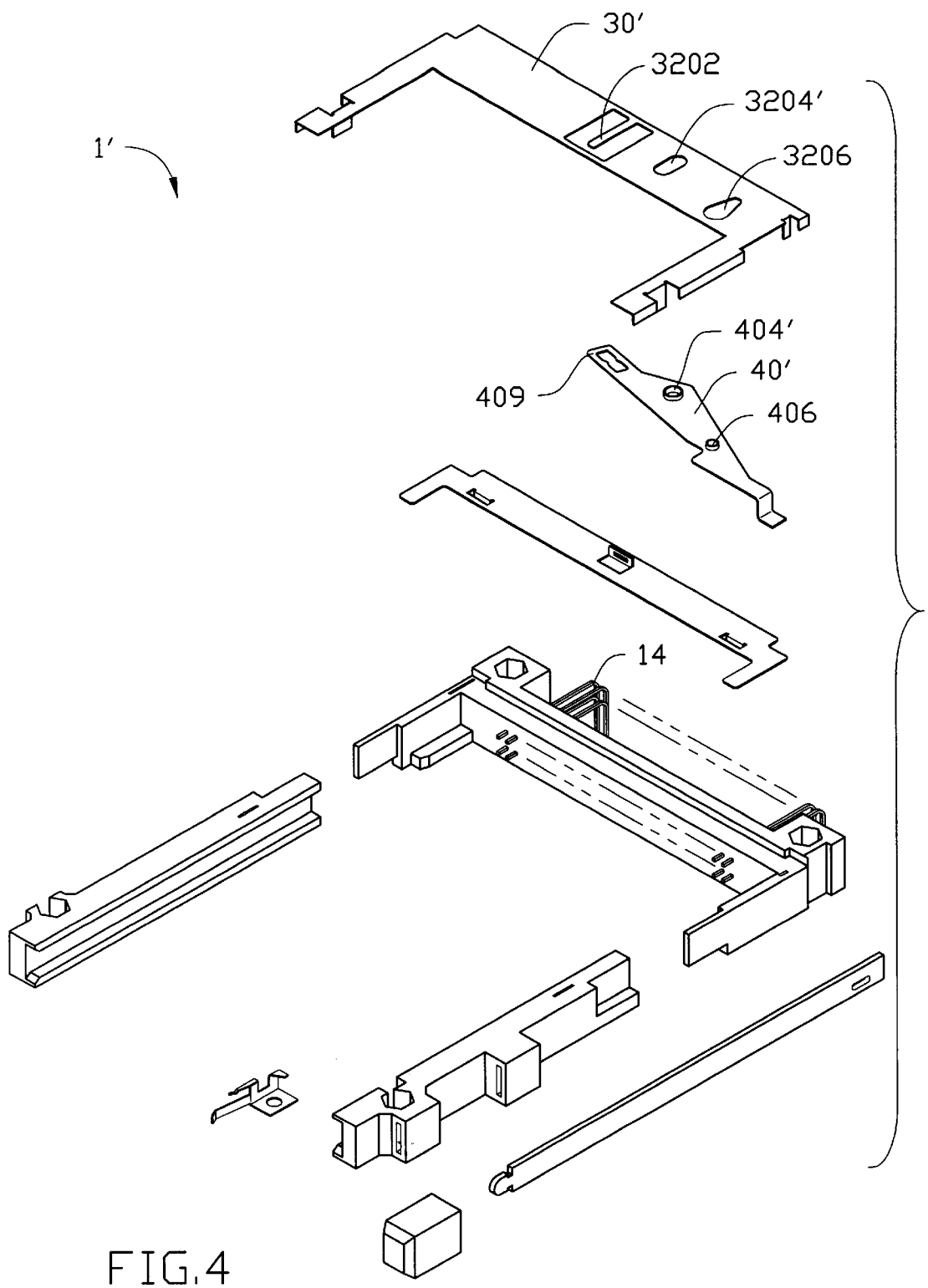
FIG. 4 is a perspective, exploded view showing a card connector apparatus in accordance with a second embodiment of the present invention.

As soon as the IC card 60 is moved to disengage from its engagement with the contact portions 142 of the contacts 14, as shown in FIG. 3B, the protrusion 406 moves upwardly along the hole 3206 to engage with the shielding shell 30 defining an upper edge (not labeled) of the hole 3206. Thereafter, the pushing force F exerted on the pushing button 28 causes the force transmitting lever 40 to further pivot about a second fulcrum P2 constituting the contact point between the protrusion 406 and the shielding shell 30 to eject the IC card 60 to its final ejected position, as shown in FIG. 3C, whereby a user can pull the IC card 60 out of the apparatus 1. The second fulcrum P2 is spaced from the force receiving tongue 408 a third distance D3, and from the force exerting end 409 a fourth distance D4. D3 is much shorter than D4 (in this embodiment, D3 is generally ⅓ of D4). Thus, when the force receiving tongue 408 moves a distance of d, the force exerting end 409 moves a distance of 3d, as shown in FIG. 3D, whereby the card 60 can be quickly ejected from the position of disengagement from the contacts 14 (FIG. 3B) to the final ejected position (FIG. 3C).

Although at the position shown in FIG. 3B, the pushing force F acting on the force receiving tongue 408 only generates an ejecting force of ⅓ F at the force exerting end 409, at this position the IC card 60 is no longer engaged with the contacts 14. Thus, the small ejecting force is enough to move the IC card 60 to its final ejected position.

FIGS. 4 to 6D show a card connector apparatus 1' in accordance with a second embodiment of the present invention and a card ejecting operation of a card ejector thereof. The connector apparatus 1' is substantially the same as the apparatus 1 with a different shielding shell 30' and force transmitting lever 40'.

The shielding shell 30' is formed to have a second hole 3204' between the pear-shaped hole 3206 and the guiding pin 3202. The second hole 3204' functions similar to the stop wall 3204 of the shielding shell 30 of the first embodiment. Furthermore, the force transmitting lever 40' is formed with a second circular protrusion 404' between the first protrusion 406 and the force exerting end 409. The second protrusion 404' functions similar to the ridge 404 of the force transmitting lever 40 of the first embodiment. When the apparatus 1' is assembled, the second protrusion 404' extends into the second hole 3204'.

Figure 6A:
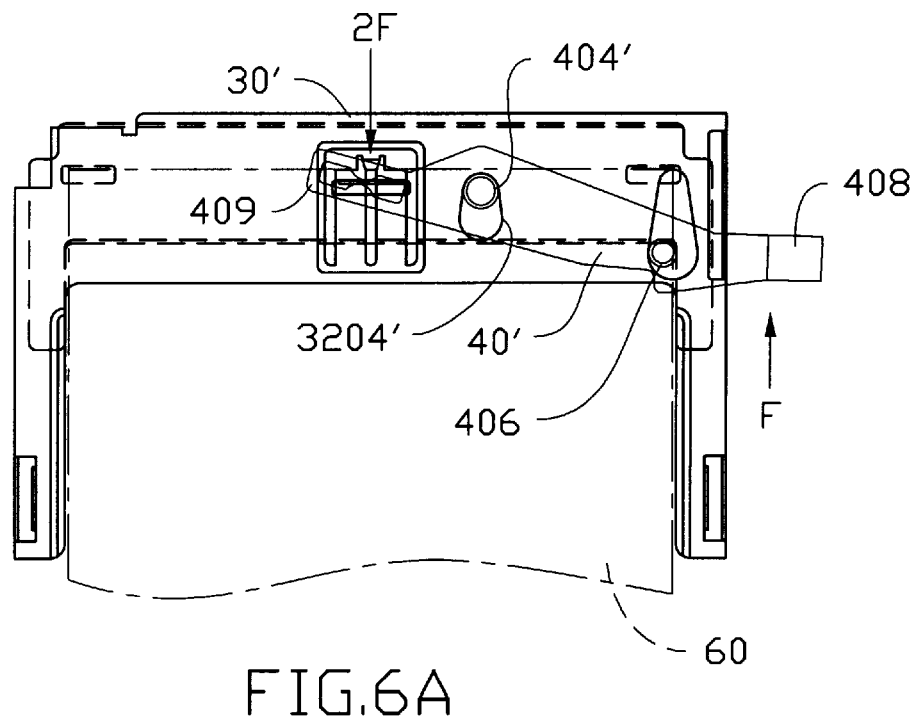
FIG. 6A is a diagrammatic view of a portion of a card ejector of the card connector apparatus of FIG. 4, wherein the card ejector is at a first position for ejecting an IC card fully inserted into the apparatus and engaging with contacts thereof.

As shown in FIG. 6A, when the IC card 60 is fully inserted into the apparatus 1', the second protrusion 404' contacts with the shielding shell 30'. When the pushing force F is exerted on the force receiving tongue 408, the lever 40' pivots about the contacting point between the shielding shell 30' and the second protrusion 404' so that an ejecting force of 2F is generated at the force exerting end 409 to eject the inserted IC card 60 to the position as shown in FIG. 6B wherein the IC card 60 disengages from the contacts 14 and the first protrusion 406 engages with the shielding shell 30'.

Figure 6B:
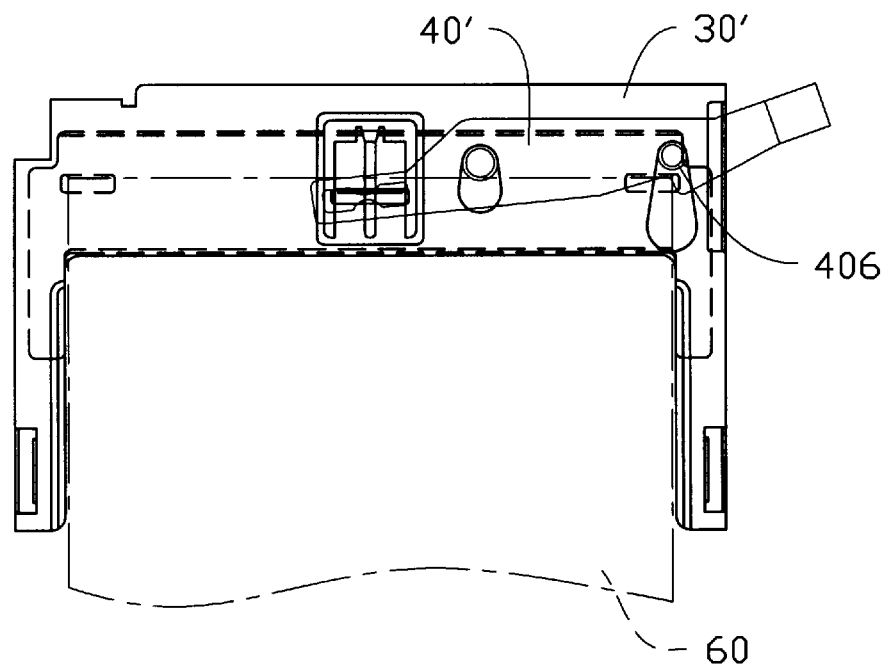
FIG. 6B is a view similar to FIG. 6A, showing that the card ejector is actuated to move from the first position to a second position wherein the IC card is ejected from its engagement with the contacts.
Figure 6C:
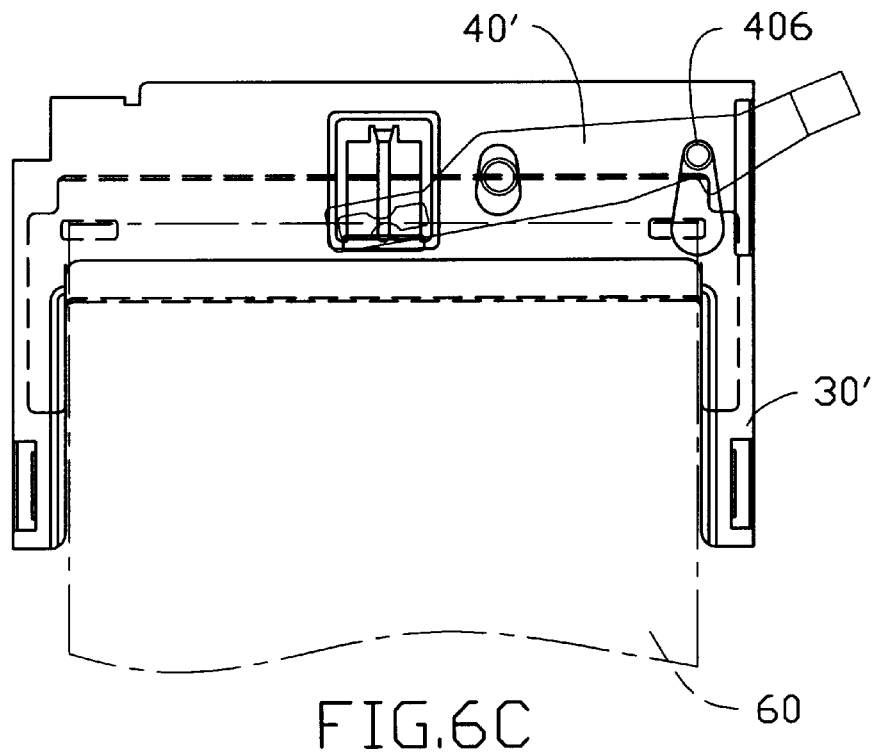
FIG. 6C is a view similar to FIG. 6A, showing that the card ejector is actuated to move from the second position to a third position wherein the IC card is moved to a final ejected position.
Figure 6D:
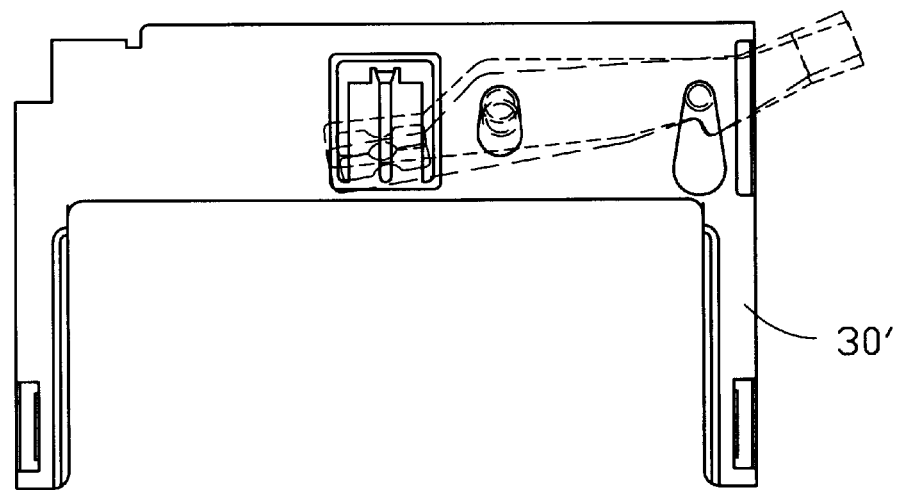
FIG. 6D is a view similar to FIG. 6A with different lines showing the movement of a force transmitting lever of the card ejector from the second position to the third position.

Thereafter, the lever 40' pivots about the contact point between the first protrusion 406 and the shielding shell 30' to enable the IC card 60 to be quickly ejected from the position of FIG. 6B to the final ejected position of FIG. 6C.

While the present invention has been described with reference to specific embodiments, the description is illustrative of the invention and is not to be construed as limiting the invention. Various modifications to the present invention can be made to the preferred embodiment by those skilled in the art without departing from the true spirit and scope of the invention as defined by the appended claims.

We claim:

1. A card connector apparatus, comprising:
    a connector having a housing mounted with a number of contacts for engaging with an IC card inserted into the apparatus; and
    ejector means pivotably mounted relative to the housing for ejecting said inserted IC card from the housing, said ejector means pivoting about a first fulcrum during a first period of ejection of the IC card and a second fulcrum during a second period of ejection of the IC card, said second fulcrum being different from said first fulcrum;
    wherein said ejector means comprises a force exerting end for exerting an ejecting force on the inserted IC card and a force receiving end for receiving a pushing force to cause the ejector means to pivot, said first fulcrum is located closer to the force exerting end than the second fulcrum; and
    a shielding shell fixed to the housing and having a lateral side proximate to the force receiving end, a stop wall and a hole between the stop wall and the lateral side, wherein said ejector means comprises a ridge between the force exerting end and the force receiving end and a protrusion between the ridge and the force receiving end, said protrusion extending into the hole, and wherein the first fulcrum constitutes a contact point between the stop wall and the ridge and the second fulcrum constitutes a contact point between the protrusion and the shielding shell.

2. The connector in accordance with claim 1, wherein said ejector means ejects the inserted IC card by pushing two lateral sides of the IC card.

3. The connector in accordance with claim 1, wherein the shielding shell comprises a guiding pin in an opening for being slidably received in the force exerting end of the ejector.

4. The connector in accordance with claim 3, wherein the ejector means has an actuator having a central portion engaging with the force exerting end and two lateral portions for engaging two lateral sides of the inserted IC card.

5. A card ejector for a card connector apparatus, said apparatus comprising a header connector with a housing having first and second mounting arms and a body therebetween, a number of contacts mounted to the body of the housing, and a guiding frame fixed to the two mounting arms of the housing for guiding an IC card into the apparatus to electrically connect with the contacts, said card ejector comprising:
    a push bar slidably mounted to the guiding frame near the first mounting arm;
    a shielding shell having two lateral sides fixed to the mounting arms of the housing, defining a first region and a second region between the first region and the lateral side fixed to the first mounting arm; and
    a force transmitting lever having a force receiving end connecting with a first end of the push bar, a force exerting end for exerting an ejecting force on an inserted IC card, a third region and a fourth region between the third region and the force receiving end;
    wherein when the ejector is actuated to eject the inserted card engaging with the contacts by pushing the push bar, the lever firstly pivots about a contact point between the first region and the third region and then pivots about a contact point between the second region and the fourth region, wherein the first region is a stop wall formed by a bent part of the shielding shell, the second region is a hole defined in the shielding shell, the third region is a ridge defined by the lever, and the fourth region is a protrusion formed on the lever, said protrusion extending into the hole.

6. The ejector in accordance with claim 5, wherein the shielding shell has first and second holes therein, the first and second regions are defined by an edge of each of the first and second holes, respectively, and the third and fourth regions are two protrusions formed on the lever extending into the two holes, respectively.

7. The ejector in accordance with claim 5 further comprising an actuator having a central region connecting with the force exerting end of the lever, and two lateral regions for engaging two lateral sides of the inserted IC card.

8. The ejector in accordance with claim 5 further comprising a push button connecting with a second end of the push bar opposite the first end thereof.

9. The ejector in accordance with claim 5, wherein the force exerting end defines a rectangular hole with a necked portion and the shielding shell forms a central guiding pin in an opening, and wherein the ejector further comprises an actuator formed with a central tab extending through the rectangular hole to slidably engage with the guiding pin and two side tabs for engaging with two lateral sides of an inserted IC card.

10. A card connector apparatus comprising:
    a header connector with a housing having first and second mounting arms and a body portion therebetween;
    a number of contacts mounted to the body portion of the housing;
    a guiding frame fixed to the two mounting arms of the housing for guiding an IC card into the apparatus to electrically connect with the contacts;
    a push bar slidably mounted to the guiding frame near the first mounting arm;
    a shielding shell having two lateral sides fixed to the mounting arms of the housing, defining a first region between the two lateral sides and a second region between the first region and the lateral side fixed to the first mounting arm;
    a force transmitting lever having a force receiving end connecting with the push bar at a first end thereof, a force exerting end for exerting an ejecting force on an inserted card, a third region between the force receiving end and the force exerting end and a fourth region between the third region and the force receiving end; and
    an actuator having a central portion connected to the force exerting end of the force transmitting lever and two lateral portions for engaging with two lateral sides of an inserted IC card to exert an ejecting force thereon when the force transmitting lever is pivoted by pushing the push bar;
    wherein when the push bar is pushed to pivot the force transmitting lever to eject the inserted card engaging with the contacts, the lever firstly pivots about a contact point between the first region and the third region and then pivots about a contact point between the second region and the fourth region;
    wherein the shielding shell forms a guiding pin, the force exerting end of the lever defines a hole, and the central portion of the actuator connected to the force exerting end is a central tab defining a slot, said central tab extending through the hole of the force exerting end of the lever and said guiding pin extending through the slot of the central tab, whereby the central tab is slidably engaged with the guiding pin and the force exerting end is sandwiched between the guiding pin and the actuator.

11. An arrangement of a card connector for providing two fulcrums during ejection of a card out of the connector, comprising:
    an ejector means pivotably mounted relative to a housing of the connector and providing a first fulcrum and a second fulcrum during rotation of the ejector means with regard to the housing wherein at least one of said two fulcrums is restrictly back and forth moveable with regard to the housing when the ejector means is rotated, relative to the housing, about the other of said fulcrums;
    wherein said at least one fulcrum is constituted by a protrusion which is formed on said ejection means and is substantially restrained to move within a corresponding hole formed on a shielding shell which is fixed to the housing of the connector.

12. A card connector apparatus, comprising:
    a connector having a housing mounted with a number of contacts for engaging with an IC card inserted into the apparatus; and
    ejector means pivotably mounted relative to the housing for ejecting said inserted IC card from the housing, said ejector means pivoting about a first fulcrum during a first period of ejection of the IC card and a second fulcrum during a second period of ejection of the IC card, said second fulcrum being different from said first fulcrum;
    wherein said ejector means comprises a force exerting end for exerting an ejecting force on the inserted IC card and a force receiving end for receiving a pushing force to cause the ejector means to pivot, said first fulcrum is located closer to the force exerting end than the second fulcrum; and
    a shielding shell fixed to the housing and having a lateral side proximate to the force receiving end, a first hole and a second hole between the first hole and the lateral side, wherein said ejector means comprises a first protrusion between the force exerting end and the force receiving end and a second protrusion between the first hole and the force receiving end, said first protrusion extending into the first hole and said second protrusion extending into the second hole, and wherein the first fulcrum constitutes a contact point between the first protrusion and the shielding shell and the second fulcrum constitutes a contact point between the second protrusion and the shielding shell.

* * * * *